(12) United States Patent
Zhu

(10) Patent No.: US 10,350,571 B2
(45) Date of Patent: Jul. 16, 2019

(54) GLASS-LINKED REACTOR AND MANUFACTURING METHOD THEREOF

(71) Applicant: Wenhua Zhu, Shanghai (CN)

(72) Inventor: Wenhua Zhu, Shanghai (CN)

( * ) Notice: Subject to any disclaimer, the term of this patent is extended or adjusted under 35 U.S.C. 154(b) by 0 days.

(21) Appl. No.: 15/953,478

(22) Filed: Apr. 15, 2018

(65) Prior Publication Data

US 2018/0229207 A1 Aug. 16, 2018

Related U.S. Application Data

(62) Division of application No. 15/026,862, filed as application No. PCT/CN2014/074772 on Apr. 4, 2014, now Pat. No. 9,975,102.

(51) Int. Cl.
| | |
|---|---|
| *B01J 19/02* | (2006.01) |
| *C23D 9/06* | (2006.01) |
| *C23D 9/00* | (2006.01) |
| *B01J 3/03* | (2006.01) |
| *C23D 5/00* | (2006.01) |
| *C23D 5/02* | (2006.01) |

(52) U.S. Cl.
CPC .............. *B01J 19/02* (2013.01); *B01J 3/03* (2013.01); *C23D 5/00* (2013.01); *C23D 5/02* (2013.01); *C23D 9/00* (2013.01); *C23D 9/06* (2013.01); *B01J 2219/0209* (2013.01)

(58) Field of Classification Search
CPC ..... B01J 19/02; B01J 2219/0209; C23D 9/00; C23D 9/06; C23D 5/00; C23D 5/02; C23D 1/00
See application file for complete search history.

(56) References Cited

FOREIGN PATENT DOCUMENTS

CN 102389758 * 3/2012

OTHER PUBLICATIONS

Machine Translation of CN102389758.*

* cited by examiner

*Primary Examiner* — Lessanework Seifu
(74) *Attorney, Agent, or Firm* — Global IP Services; Tianhua Gu

(57) ABSTRACT

A glass lined reaction tank for chemical and pharmaceutical industries and a manufacturing method thereof. One-step molding technical standards for manufacturing iron blanks of the glass lined reaction tanks are deeply developed, an overall structure of a flanged big flange of a tank body and a tank cover matching with the tank body are innovated, and nominal pressure of the big flange and the sealing performance of a tank mouth are perfectly improved. By using a new structurally-combined precise controlled internal heating type electric furnace and an intelligent temperature program control/adjustment/recording instrument, heating temperature of an overall glass lining layer on an inner wall of the tank body is more accurately controlled to be the same, and a synchronous, integral and controlled sintering core technique is realized.

6 Claims, 8 Drawing Sheets

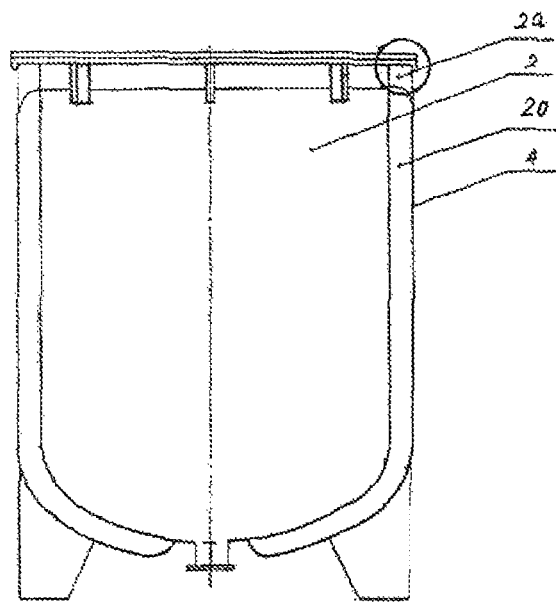
Fig. 2
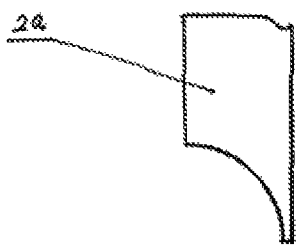
Fig. 2a
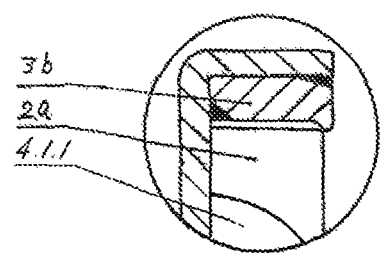
Fig. 2a1
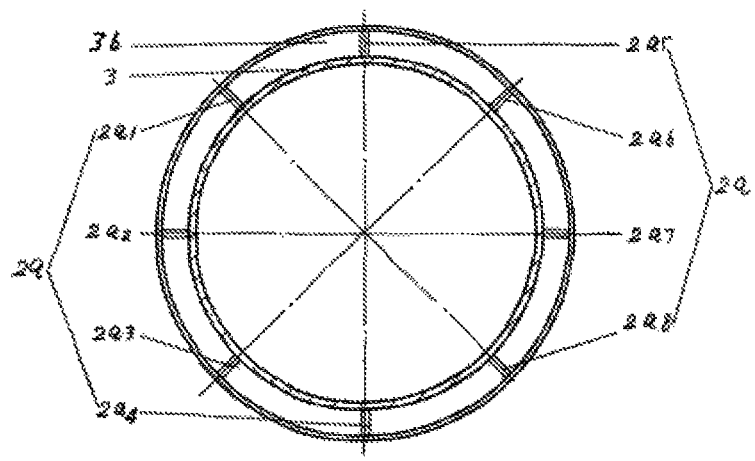
Fig. 2a2

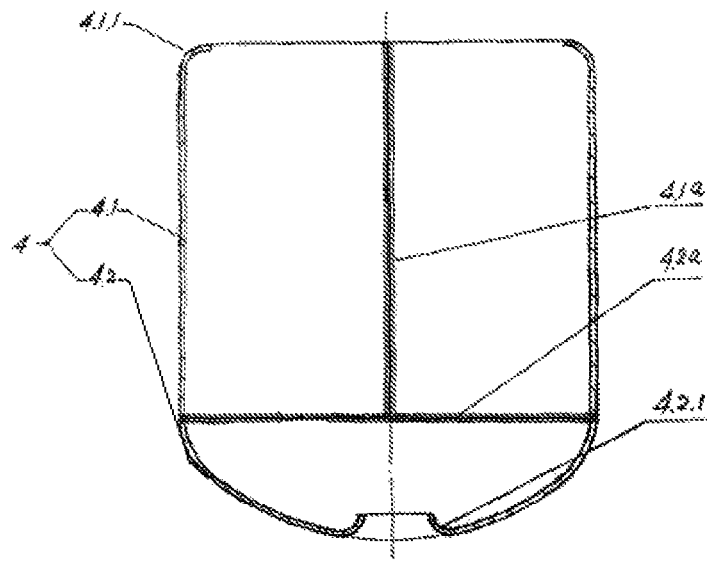
Fig. 4
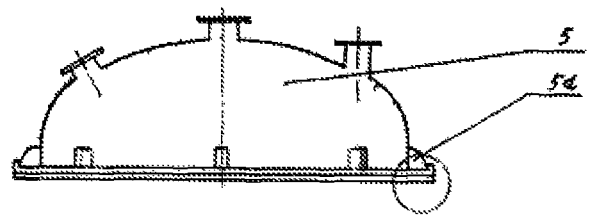
Fig. 5
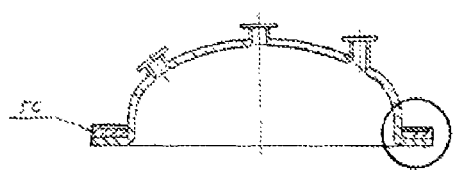 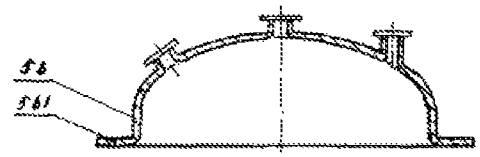
Fig. 5a         Fig. 5b

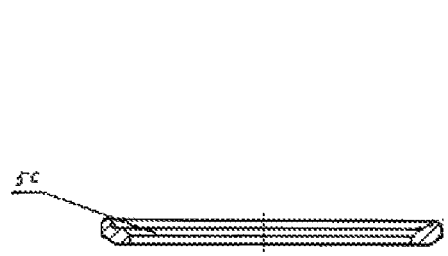
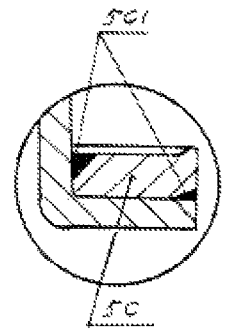
Fig. 5c          Fig. 5c1
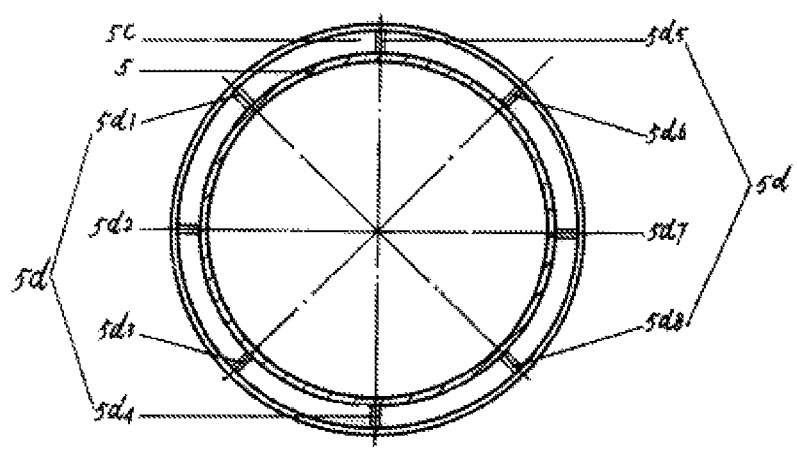
Fig. 5c2
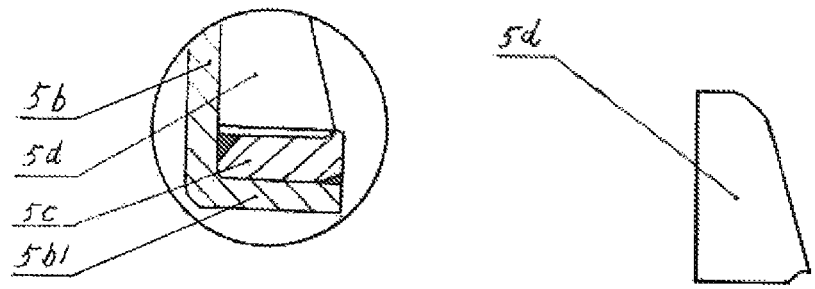
Fig. 5c3          Fig. 5d

GLASS-LINKED REACTOR AND MANUFACTURING METHOD THEREOF

CROSS REFERENCE TO RELATED PATENT APPLICATION

The present application is a divisional application of U.S. Ser. No. 15/026,862 filed on Apr. 25, 2016, which claims the priority of the PCT/CN2014/074772 entering US national stage filed on Apr. 4, 2014.

FIELD OF INVENTION

The present invention relates to a new glass lined reaction tank for chemical and pharmaceutical industries and a manufacturing method thereof, and belongs to the field of pressure vessel apparatuses for chemical and pharmaceutical industries.

DESCRIPTION OF RELATED ARTS

Glass lined reaction tanks belong to Class II pressure vessel reaction apparatuses. A tank body of each glass lined reaction tank consists of an inner cylinder body (an inner wall of which is coated and sintered with a glass lining layer) and an outer jacket. At present, electric furnaces for sintering the glass lined reaction tanks at home and abroad are all external heating type electric furnaces, and iron blanks thereof are all manufactured by adopting secondary processing molding. Firstly, a glass lining layer of an inner wall of the inner cylinder body with an upper connecting ring and a lower connecting ring (transitional structure members of the outer jacket) is sintered, then the outer jacket is assembled and welded, and a single-sided circumferential butt welding seam added with a lining plate is formed at the position of the upper connecting ring thereof. Chinese standards Technical Conditions for Glass Lined Equipment (HG2432-2001) issued on Jan. 24, 2002 regulate that nondestructive testing can be exempted to be performed to the circumferential welding seam at this position, which is obviously not in compliance with the manufacturing specifications of pressure vessels, resulting that the Chinese "technical standards" for manufacturing the glass lined reaction tanks are not recognized by other countries in the world. For this reason, Chinese standards Technical Conditions for Glass Lined Equipment (GB25025-2010)issued on Sep. 2, 2010 regulate that surface nondestructive testing shall be performed to the circumferential welding seam at this position, which however is not in compliance with the manufacturing specifications of variable-pressure vessels.

Since the iron blank of the tank body is manufactured by adopting secondary processing molding, consequently three major serious product quality problems are caused and are difficult to solve. For the inner cylinder body provided with the upper connecting ring and the lower connecting ring and formed by single-layer steel plates, after 6-8 times of high-temperature roasting at approximately 900° C., a basal body is integrally deformed and presents distorted skirt type deformation. When the upper connecting ring is assembled and welded with the cylinder body of the jacket, firstly shaping is forcibly performed, then electric welding is performed, consequently high-temperature shock and welding seam stress cause potential hazards such as micro-cracks to the glass lining layers, and as a result, the overall quality of the glass lining layers is seriously influenced.

For an external heating type electric furnace, heat released by electric heating power thereof firstly radiates the outer wall of the steel plates of the inner cylinder body and then is transferred to the glass lining layers on the inner wall. Accordingly, it can be seen that what is measured and controlled thereby is the temperature of the furnace body. In addition, the thickness of a steel plate of a high-neck big flange on the inner cylinder body is 2.5 times of the thickness of a straight cylinder body, the heat capacity needed thereby is great, a group of upper and lower connecting ring structure components and a supporting frame or a hanger sintered by using a product exist on the outer side of the inner cylinder body form flame barriers to the external heating type electric furnace during heating, heating temperature of the glass lining layers on the inner walls of the above parts is obviously lower than that of other parts, consequently the temperature controlled by the controlled sintering "core technique" executed by the external heating type electric furnace is not the actual heating temperature of the glass lining layers, the heating is not even, the temperature difference is great and the remarkable improvement of the overall quality of the product is directly influenced.

Since the glass lined reaction tank is repetitively sintered at high temperature in the external heating type electric furnace, the deformation of the basal body causes the big flange of the apparatus to be integrally deformed, the sealing performance of the tank mouth of the reaction tank is directly influenced, consequently reaction medium gas in the tank is caused to leak, and problems of environmental protection and safety production are involved. As a result, clips have to be forcibly tightened during use and the glass lining layer on the surface of the big flange is caused to be cracked. According to the new national standards Technical Conditions for Glass Lined Equipment (GB25025-2010), when difference between maximum diameter and minimum diameter of the flange of the apparatus should be smaller than or equal to 6 mm when DN is smaller than or equal to 1000 mm, and should be smaller than or equal to 10 mm when DN is greater than 1000 mm; flatness tolerance should be smaller than or equal to 2 mm when DN is smaller than or equal to 1000 mm and should be smaller than or equal to 2.5 mm when DN is greater than 1000 mm; and width of a pressed face of the flange of the apparatus should be greater than or equal to 15 mm.

When the damaged glass lining layer of the reaction tank is repaired, at the welding position between upper and lower connecting ring transition pieces and the outer jacket, the outer jacket needs to be cut off by using oxy-acetylene flames, then the single-sided circumferential welding joint which is not flat and straight, is curved and is added with the lining plate are welded again with the lower connecting ring to form the tank body after the glass lining layer is repetitively sintered and inspected as qualified, and this is not in compliance with the repair specifications of the pressure vessels. According to reports, explosion accidents were ever caused for this reason.

The glass lined reaction tanks belong to high-value consumables and are damaged generally after 1-2 years of use. It should be pointed out that the area of the damaged glass lining layers of a considerable quantity of reaction tanks only accounts for 0.05% of the total area and some only have several small point area damages. In China, a great number of reaction tanks which are worth several hundred millions of Chinese Yuan and consume several ten thousands of tons of steel materials are discarded every year for a reason that the glass lining layers are damaged and cannot be repaired for reuse, the steel materials are greatly wasted and the capital losses are serious.

Therefore, the present invention deeply develops one-step molding "technical standards" of the iron blank of the tank body of the glass lined reaction tank and innovatively manufactures a high-grade new glass lined reaction tank which has Chinese pioneer creative independent intellectual property and overall quality which is superior to the international advanced level, so as to drive a great revolution of the glass lining industry in the modern world.

Patent CN201110287709.0 discloses a glass lined reaction tank which is sintered by adopting an internal heating type electric furnace. However, this glass lined reaction tank still cannot thoroughly eliminate various potential hazards and defects in the integral glass lining layers to the utmost extent, the nominal pressure of the tank mouth big flange and the sealing performance of the tank mouth still cannot be perfectly improved, and it is difficult to manufacture a glass lined reaction tank which comprehensively satisfies requirements on Class III pressure vessels.

SUMMARY OF THE PRESENT INVENTION

The purposes of the present invention are to create a new glass lined reaction tank and a manufacturing method thereof, continuously and deeply develop and create one-step molding "technical standards" for manufacturing iron blanks of tank bodies, replace the existing glass lined reaction tanks and manufacturing methods thereof through all-around advantages, and overcome the problems that the big flange of the apparatus is deformed, the sealing performance of the tank mouth is poor, the potential hazards and defects of the glass lining layers are many, the service life of the products is not long, the reaction tanks cannot be repaired and reused as pressure vessels after the glass lining layers are damaged, the steel materials are seriously wasted, the capital losses are very great and the like in the current secondary processing molding "technical standards" for manufacturing the iron blanks of the tank bodies.

The present invention adopts the one-step molding "technical standards" to implement the manufacturing of the iron blank of the tank body of the glass lined reaction tank.

The tank body of the new glass lined reaction tank of the present invention comprises a new inner cylinder body and a new outer jacket, and the new inner cylinder body comprises a straight cylinder body, a seal head connected with the straight cylinder body and a discharge outlet flange. An upper mouth of the straight cylinder body of the new inner cylinder body is flanged to form a first big flange, and a first reinforcing ring body which is in precise fit with the first big flange is welded at a lower portion thereof. Steel plate thickness of the first reinforcing ring body is set, adjusted and increased according to nominal diameter of the tank body, so as to greatly improve and increase mechanical performance of resisting high-temperature deformation of the big flange and obviously improve nominal pressure of the big flange and sealing performance of a tank mouth. A lower portion of the new inner cylinder body is the discharge outlet flange. The new outer jacket is an integral structure formed by welding a jacket body with a closing mouth and a seal head with an inner ring type closing mouth structure. After the new inner cylinder body and the new outer jacket are all detected according to methods in standards JB/T 4730 and satisfy requirements on Class II pressure vessels in Supervision Regulations on Safety Technology of Pressure Vessels, and then are welded to form the tank body with the integral structure, and a chamber exists between the new inner cylinder body and the new outer jacket. Glass lining layers are respectively coated and sintered on an inner wall of the new inner cylinder body, an outer wall of the new inner cylinder body and an inner wall of the new outer jacket.

Further, glass lining layers are respectively coated and sintered on the inner wall of the new inner cylinder body, a big flange surface, a discharge outlet flange surface, the outer wall of the new inner cylinder body and the inner wall of the new outer jacket.

Further, steel plate thickness of the new inner cylinder body and the new outer jacket is increased by 2-10 mm according to current glass lined pressure vessel design and manufacturing standards.

The steel plate thickness of the cylinder body and the outer jacket of the tank body of the new glass lined reaction tank of the present invention is increased by 2-10 mm according to glass lined pressure vessel design and manufacturing standards, and the glass lining layers are coated and sintered on the outer wall of the inner cylinder body and the inner wall of the outer jacket. The purposes of this design are to prevent the surface of the iron blank of the tank body from being oxidized due to repetitive high-temperature sintering and prevent steel plates from being corroded and thinned during actual production use. After the glass lining layers of the reaction tank of the present invention are damaged, as long as the steel plate thickness of the tank body is inspected and comprehensively satisfies Class II pressure vessel design and manufacturing standards, the tank body with the jacket can be repetitively and integrally repaired and reused, a repair process comprehensively satisfies Class II pressure vessel specifications and the quality of the repaired tank body satisfies standards of new products.

Further, the tank body further comprises a plurality of groups of symmetrical reinforcing rebar plates, the plurality of groups of reinforcing rebar plates are arranged between the first reinforcing ring body of the tank body and a closing mouth part of the jacket body with the closing mouth and are symmetrically combined and welded along a circumference of the tank body, and thus the nominal pressure of the big flange and the sealing performance of the tank mouth are remarkably improved.

A tank cover of the new glass lined reaction tank of the present invention comprises a tank cover straight cylinder body, a lower mouth of the tank cover straight cylinder body is flanged to form a second big flange, a second reinforcing ring body which is in precise fit with an outer circumference of the tank cover straight cylinder body is welded at an upper portion of the second big flange, and preferably the second reinforcing ring body is provided with an arc-shaped neck. Steel plate thickness of the second reinforcing ring body can be set, adjusted and increased according to nominal diameter of the tank cover. The larger the nominal diameter of the tank cover is, the larger the steel plate thickness of the second reinforcing ring body is. The second reinforcing ring body is circumferentially welded along the tank cover straight cylinder body to form an integral structure of the tank cover, so as to greatly improve the nominal pressure of the big flange and the sealing performance of the tank mouth. A plurality of groups of second rebar plates having a reinforcing effect are further welded on the second reinforcing ring body; and glass lining layers are coated and sintered on an inner wall of the tank cover, a second big flange surface and each flange surface at an upper portion of the tank cover.

More preferably, a number of the respective symmetrical reinforcing rebar plates of the tank body and the tank cover is 8-36.

By reforming the structures of the integral structure component of the tank body and the matched tank cover structure component, the present invention can guarantee that the big flange surface is absolutely not deformed after repetitive high-temperature sintering, the nominal pressure of the big flange surface and the overall sealing performance of the tank mouth are perfectly improved, and after the glass lining layers on the inner walls are sintered and inspected as qualified, the glass lined reaction tank which comprehensively satisfies requirements on Class III pressure vessels can be obtained.

The present invention uses an intelligent temperature program control/adjustment/recording instrument which is combined with a new structurally-combined precise controlled internal heating type electric furnace, and implements a controlled sintering "core technique", so as to precisely implement synchronous integral sintering of the integral glass lining layers of the tank body at the same heating temperature, thoroughly eliminate various potential hazards and defects in the glass lining layers of the reaction tank to the utmost extent and realize the highest quality index of zero pinhole.

A manufacturing method of the new glass lined reaction tank of the present invention specifically comprises the following steps:

1) manufacturing an inner cylinder body component, and respectively performing X-ray flaw detection to a longitudinal welding joint and a circumferential welding joint on the new inner cylinder body according to JB/T4730 to obtain a new inner cylinder body which satisfies supervision regulations on safety technology of Class II pressure vessels, wherein steel plate thickness of the new inner cylinder body is increased by 2-10 mm according to current glass lined pressure vessel design and manufacturing standards;

2) manufacturing an inner cylinder body with an integral structure: welding a first reinforcing ring body which is in precise fit with the outer diameter of the new inner cylinder body and is provided with an arc-shaped neck on an outer side at a lower portion of the flanged first big flange of the new inner cylinder body, and circumferentially welding two groups of circumferential welding joints therebetween to form the inner cylinder body with the integral structure, wherein in order to guarantee that the big flange surface is not deformed during repetitive high-temperature sintering, steel plate thickness of the first reinforcing ring body can be set, adjusted and increased according to nominal diameter of the tank body;

3) respectively manufacturing a jacket body with a closing mouth and an outer jacket seal head with an inner ring type closing mouth structure, and welding to form an integral structure to obtain a new outer jacket with the integral structure, wherein, more preferably, steel plate thickness of the new outer jacket is increased by 2-10 mm according to current glass lined pressure vessel design and manufacturing standards;

4) performing X-ray flaw detection to a longitudinal welding joint and a circumferential welding joint on the new outer jacket according to JB/T4730 to obtain the new outer jacket which satisfies supervision regulations on safety technology of Class II pressure vessels;

5) coating glass lining slurry on an outer wall of the new inner cylinder body and an inner wall of the new outer jacket;

6) welding the new inner cylinder body and the new outer jacket to form an integral structure to obtain the tank body which satisfies supervision regulations on safety technology of Class II pressure vessels;

7) welding a plurality of groups of symmetrical reinforcing rebar plates between the first reinforcing ring body of the new inner cylinder body inspected as qualified and a closing mouth part of the new jacket body, wherein the plurality of groups of symmetrical reinforcing rebar plates are symmetrically combined and welded along the circumference of the tank body; and the first reinforcing ring body and the plurality of groups of symmetrical reinforcing rebar plates can perfectly improve the nominal diameter of the big flange of the tank body and the sealing performance of the tank mouth;

8) coating glass lining slurry on an inner wall of the new inner cylinder body, and further coating glass lining slurry on a flanged big flange surface and a discharge outlet flange surface of the new inner cylinder body to obtain the tank body coated with the glass lining slurry on the inner wall;

9) using a new structurally-combined precise controlled internal heating type electric furnace with an intelligent temperature program control/adjustment/recording instrument to implement a controlled sintering "core technique" to the glass lining layers coated on the inner wall of the tank body, the flanged big flange surface and the discharge outlet flange surface, so as to form optimum and firmest wire-mesh-shaped adherence layers between steel plates and glass lining prime coat, lay a foundation for precisely implementing synchronous integral sintering between the glass lining prime coat and glass lining finish coat and between the glass lining finish coat and the glass lining finish coat at the same heating temperature, thoroughly eliminate various potential hazards and defects to the utmost extent and realize the highest quality index of zero pinhole;

10) repetitively sintering the tank body of the reaction tank by using the new structurally-combined precise controlled internal heating type electric furnace combined with the intelligent temperature program control/adjustment/recording instrument, and coating glass lining layers on the inner wall of the new inner cylinder body, the flanged big flange surface and the discharge outlet flange surface before sintering at each time;

11) cooling the tank body of the new glass lined reaction tank sintered at the last time together with the furnace according to a specific temperature lowering curve, and performing a hydraulic test to the chamber between the inner cylinder body and the outer jacket to obtain the tank body of the glass lined reaction tank; and 12) manufacturing a tank cover: manufacturing a tank cover with a tank cover straight cylinder body with a lower mouth which is flanged to form a second big flange, welding a second reinforcing ring body which is in close fit with an outer circumference of the tank cover straight cylinder body and is provided with an arc-shaped neck at an upper portion of the flanged second big flange of the tank cover, and circumferentially welding two groups of circumferential welding joints, wherein steel plate thickness of the second reinforcing ring body can be set, adjusted and increased according to nominal diameter of the tank cover, and the larger the nominal diameter of the tank cover is, the larger the steel plate thickness of the second reinforcing ring body is; circumferentially welding a plurality of groups of symmetrical reinforcing rebar plates and the second reinforcing ring body along the tank cover straight cylinder body to form an integral structure component of the tank cover, so as to greatly improve the nominal pressure of the big flange of the tank cover and the sealing performance of the tank mouth; and coating and sintering glass lining slurry on the inner wall of the integral structure component of the tank cover, a second big flange surface and each flange surface at an upper portion of the tank cover to obtain the tank cover of the new glass lined reaction tank.

The glass lining slurry used in steps 5), 8) and 12) is common glass lining slurry in the prior art or special glass lining slurry provided according to the demands of reaction mediums in the tank. More preferably, the glass lining slurry can be coated by using a full-automatic slurry coating apparatus.

In step 11), after the tank body of the new glass lined reaction tank is sintered at the last time, the temperature lowering curve can be set according to conversion from a soft state to a solid state of the glass lining layers and the tank body can be cooled slowly together with the furnace, so as to effectively avoid the generation of residual stress and hairline cracks in the glass lining layers of the tank body.

Preferably, for the temperature decreasing speed during slow cooling with the furnace, the tank body can be controlled to be slowly cooled from furnace temperature 650° C. to 150° C. within 6-8 h.

In step 9), the controlled sintering "core technique" refers to a controlled sintering process implementing medium-temperature pre-sintering, high-temperature sintering and heat preserving stages during sintering of the glass lining prime coat on the inner wall of the tank body. Sintering temperature can be room temperature to 900° C., and total sintering time is 5-6h.

In steps 9) and 10), by using the new structurally-combined precise controlled internal heating type electric furnace with the intelligent temperature program control/adjustment/recording instrument, the measurement and control accuracy of the system can reach ±1° C., and the optimum sintering process of the glass lined reaction tank can be comprehensively and precisely controlled and realized. The controlled sintering "core technique" is strictly followed, specific temperature at each stage of rising temperature, preserving heat and lowering temperature is precisely controlled, and a computer is used for executing the recording, printing and filing of the sintering process curve.

The new structurally-combined precise controlled internal heating type electric furnace used for sintering the tank body in step 9) includes several reformations as follows:

A first structural reformation of the new structurally-combined precise controlled internal heating type electric furnace is that a group of temperature-adjustable straight ring body electric furnaces are added on an original ring planar electric furnace and are used for auxiliary heating of the integral structure component on the outer side of the big furnace of the tank body structure component, so as to effectively control synchronous integral sintering of the glass lining layers on the big flange surface of the inner cylinder body of the tank body and the integral inner wall at the same heating temperature.

A second structural reformation of the new structurally-combined precise controlled internal heating type electric furnace is that a seal-head-shaped heating structure component which is made of heat-resistant steel and is structurally fit and consistent with the inner wall of the seal head of the new inner cylinder body is added on the periphery of a truncated-cone step-shaped electric furnace, so as to effectively improve even heating of the seal-head-shaped heating structure component and precisely control synchronous integral sintering of the glass lining layers on the inner wall of the seal head of the inner cylinder body of the tank body and the integral inner wall at the same heating temperature.

A third structural reformation of the new structurally-combined precise controlled internal heating type electric furnace is that the tank body of the glass lined reaction tank is inversely placed on the main body heating electric furnace and a group of temperature-adjustable new planar electric furnaces which can increase diameter of an original planar electric furnace are added at a bottom portion of a sintering hanger self-rotating piece of the tank body and are used for auxiliary heating of an inner ring type closing mouth part of the outer jacket corresponding to the tank body, so as to effectively control synchronous integral heating of the glass lining layers on the inner wall at the same heating temperature.

Specifically, in step 9) and step 10), the new structurally-combined precise controlled internal heating type electric furnace comprises a heat preserving cylinder body, a top portion of the heat preserving cylinder body is provided with a group of heat preserving furnace top doors which can be opened and closed, the heat preserving furnace top doors thereon are provided with a tank body sintering hanger self-rotating piece which penetrates through the heat preserving furnace top doors, and a bottom portion of the tank body sintering hanger self-rotating piece is further provided with a new planar electric furnace; and the new structurally-combined precise controlled internal heating type electric furnace further comprises a main body heating electric furnace in the heat preserving cylinder body, and the main body heating electric furnace sequentially comprises a ring body planar electric furnace, a multilayer regionally-combined cylindrical electric furnace and a truncated-cone step-shaped electric furnace from bottom to top; a ring body planar furnace lifting piece is further provided below the ring body planar electric furnace; the ring body planar electric furnace consists of a ring planar electric furnace and a straight ring body electric furnace; a ring plane of the ring planar electric furnace and a circumferential wall of the inner side of the straight ring body electric furnace thereon are respectively provided with a group of electric heating elements; a group of electric heating elements are wound in the ring grooves of every 2-8 layers, preferably 5-8 layers, of ring grooves of the multilayer regionally-combined cylindrical electric furnace; a group of electric heating elements are wound in every 2-8 layers, preferably 5-8 layers, of step-shaped platform surfaces of the truncated-cone step-shaped electric furnace; a seal-head-shaped heating structure component which is structurally fit and consistent with an inner wall of the seal head of the inner cylinder body covers a periphery of the truncated-cone step-shaped electric furnace; and all groups of electric heating elements in the new structurally-combined precise controlled internal heating type electric furnace are respectively connected with a temperature control system.

The temperature control system is used for adjusting heating temperature of electric heating elements connected with the temperature control system, and comprises a temperature measuring element and a temperature controller, wherein the temperature measuring element is fit with a group of electric heating elements, is arranged in a heating area of the group of electric heating elements and is used for measuring heating temperature of the inner chamber of the tank body in the heating area of the group of electric heating elements and transmitting a temperature signal; and the temperature controller is arranged outside the heat preserving cylinder body of the precise controlled internal heating type electric furnace, is connected with the temperature measuring element and the electric heating elements which are fit with the temperature measuring element, the temperature controller stores predetermined temperature or a temperature control curve, and is used for receiving the temperature signal transmitted by the temperature measuring element, comparing the temperature signal with the predetermined temperature or the temperature control curve and then adjusting the heating temperature of the electric heating elements.

Since each group of electric heating elements is independently fit with a temperature control system, heating power of each group of electric heating elements can be independently adjusted.

The temperature controller is optionally an intelligent temperature program control/adjustment/recording instrument, so as to precisely realize temperature presetting, temperature control and automatic recording.

An integral structure shape of the main body heating electric furnace is fit and consistent with the structure shape of the new inner cylinder body of the tank body, and the ring body planar electric furnace, the multilayer regionally-combined cylindrical electric furnace and the truncated-cone step-shaped electric furnace respectively and correspondingly heat the flanged big flange, the straight cylinder body and the inner seal head of the new inner cylinder body.

Demands for heat capacity of the ring body planar electric furnace, the multilayer regionally-combined cylindrical electric furnace and the truncated-cone step-shaped electric furnace in the main body heating electric furnace are different according to different steel plate thicknesses of the structure parts of the combined new inner cylinder body. The electric heating elements in the ring body planar electric furnace, the electric heating elements in the multilayer regionally-combined cylindrical electric furnace and the electric heating elements in the truncated-cone step-shaped electric furnace directly radiate heat to the glass lining layers on the inner wall of the new inner cylinder body, the flanged big flange surface and the discharge outlet flange surface respectively according to different needed electric heating power through seal-head-shaped heating structure components made of heat-resistant steel, so as to implement synchronous integral heating at the same heating temperature.

During sintering, the tank body of the new glass line reaction tank is inversely placed on the main body heating electric furnace, the new planar electric furnaces, the ring body planar electric furnace, the multilayer regionally-combined cylindrical electric furnace and the truncated-cone step-shaped electric furnace respectively at the bottom portion of the tank body sintering hanger self-rotating piece correspond to the glass lining layers on the discharge outlet flange surface of the new inner cylinder body of the new glass lined reaction tank and the closing mouth part with inner ring type of the outer jacket seal head, the flanged big flange surface of the tank body and the integral structure component on the outer side thereof, the straight cylinder body and the inner wall of the inner seal head. The tank body sintering hanger self-rotating piece slowly self-rotates in the whole process of sintering of the new glass lined reaction tank. The heat preserving cylinder body is made of aluminum silicate fibers.

For the new structurally-combined precise controlled internal heating type electric furnace with the intelligent temperature program control/adjustment/recording instrument, the temperature control accuracy of the system is ±1° C., and in the repetitive sintering process of each glass lined reaction tank, temperature program control can be precisely set, the temperature rising, heat preserving and temperature lowering whole-process sintering temperature curve of each specific temperature section during stage-by-stage controlled sintering at each time can be adjusted and automatically recorded, and thus the overall quality of the glass lined reaction tank is efficiently and highly improved.

Heat capacity of the new structurally-combined precise controlled internal heating type electric furnace with the intelligent temperature program control/adjustment/recording instrument is different according to different steel plate thicknesses of the structure components of the new glass lined reaction tank, and the needed heating power is also different. By adopting multi-component combined and unit-grouped temperature control systems and using the new structurally-combined precise controlled internal heating type electric furnace with the intelligent temperature program control/adjustment/recording instrument, the electric heating power thereof can be set according to actual needs, and in combination with the ring body planar electric furnace lifting piece, precise adjustment can be performed to realize synchronous integral sintering of the glass lining layers on the inner wall of each component at the same heating temperature. For example, the steel plate thickness of the first reinforcing ring body on the flanged big flange is greatly different from the steel plate thickness of the new inner cylinder body, thus the heat capacity needed thereby is different and the needed heating power is also different. By adopting multi-component combined and unit-grouped temperature control systems and using the new structurally-combined precise controlled internal heating type electric furnace with the intelligent temperature program control/adjustment/recording instrument, the temperature control accuracy of the system is ±1° C., the medium-temperature pre-sintering, high-temperature sintering, heat preserving and stage-by-stage controlled sintering "core technique" can be scientifically, precisely and comprehensively implemented, the physical and chemical reaction of steel materials can be strictly followed, and optimum and perfect physical and chemical reaction can be realized between steel materials and glass lining prime coat, between glass lining prime coat and glass lining finish coat and between glass lining finish coat and glass lining finish coat, so as to thoroughly eliminate various defects in the glass lining layers to the utmost extent, realize the highest quality index of zero pinhole and greatly improve the overall quality and service life of the glass lined reaction tank.

By using the new structurally-combined precise controlled internal heating type electric furnace which is combined with the intelligent temperature program control/adjustment/recording instrument, through precise and perfect cooperation therebetween, the deep development of the manufacturing method of the new glass lined reaction tank is greatly pushed, the nominal pressure of the tank body big flange and the sealing performance of the tank mouth are perfectly improved, the glass lined reaction tank which comprehensively satisfies requirements on Class III pressure vessels is innovatively created, and development can be made towards directions of thoroughly eliminating various potential hazards and defects in the glass lining layers to the utmost extent and realizing the highest quality index of zero pinhole, so as to greatly improve the overall quality and service life of the new glass lined reaction tank.

For the glass lined reaction tank manufactured by adopting the method provided by the present invention, not only the nominal pressure of the tank body big flange and the sealing performance of the tank mouth can be perfectly improved, development can be made towards the highest quality index of exemption from form and location tolerance of the glass lined parts in current Technical Conditions for Glass Lined Equipment (GB25025-2010) and glass lined reaction tanks which satisfy requirements on Class II pressure vessels can be obtained, but also new glass lined reaction tanks which comprehensively satisfy requirements on Class III pressure vessels that are suitable for chemical reaction of extremely toxic and highly toxic mediums and inflammable or moderately toxic mediums can be obtained.

By using the new structurally-combined precise controlled internal heating type electric furnace with the intelligent temperature program control/adjustment/recording instrument to sinter the new glass lined reaction tank, the present invention generally has the following advantages: (1) the defects including pinholes such as invisible bubbles, cracks, slurry flowing and lining layer burst caused by over-sintering or incomplete sintering due to uneven heating and great temperature difference of structure components of the glass lined reaction tank during heating in the external heating type electric furnace are thoroughly eliminated to the utmost extent; (2) the formation of integral optimum and firmest wire-mesh-shaped adherence layers which are mutually inlaid, are indented, fully penetrate and are compactly combined can be facilitated; and full fusion and firm combination between glass lining prime coat and glass lining finish coat and between glass lining finish coat and glass lining finish coat are realized, and the effects of compactness and smoothness are achieved; and (3) since the steel plates of the inner cylinder body and the outer jacket of the tank body are respectively thickened and the glass lining layers are respectively coated and sintered on the outer wall of the new inner cylinder body and the inner wall of the new outer jacket, the defect that the steel plates are thinned during repetitive high-temperature sintering and long-term production use of the tank body is made up, the tank body can be repetitively repaired and reused as long as the steel plate thickness of the tank body is inspected and comprehensively satisfies Class II pressure vessel design and manufacturing standards, and the quality of the repaired tank body satisfies the standards of new products.

In general, the present invention has the following beneficial effects:

The present invention realizes the deep development of one-step molding "technical standards" for manufacturing iron blanks of tank bodies and successfully breaks through the following three major serious quality problems involved in secondary processing molding for manufacturing iron blanks of tank bodies: potential hazards such as microcracks are caused to the glass lining layers for reasons that the upper connecting ring of the inner cylinder body is firstly and forcibly shaped and then is electrically welded and consequently high-temperature thermal shock and welding seam stress are produced; since what is measured and controlled by the external heating type electric furnace is furnace body temperature, the accuracy is low and the thickness of the high-neck big flange is more than two times of the steel plate thickness of the inner cylinder body, consequently the integral glass lining layers on the inner cylinder body are not evenly heated, the temperature difference is great and various potential hazards and defects are caused; and the reaction tank cannot be repaired and reused as a pressure vessel after the glass lining layers of the reaction tank are damaged.

The present invention innovatively reforms the integral structure of the flanged big flange of the tank body, replaces the existing high-neck big flange structure component and guarantees that the sealing performance of the tank mouth satisfies the actual production demands. In addition, since the tank body and tank cover integral structures are matched with each other, the mechanical performance of resisting high-temperature deformation of the big flange surface is greatly improved, the nominal pressure of the big flange and the sealing performance of the tank mouth are perfectly improved, the problem that the glass lining layer on the big flange surface is cracked for a reason that the clips are excessively and forcibly tightened is avoided, the environmental protection is facilitated and the safety production is guaranteed. The present invention innovatively creates high-grade and high-quality new glass lined reaction tanks which comprehensively satisfy requirements on Class III pressure vessels that are suitable for chemical reaction of extremely toxic and highly toxic mediums and inflammable or moderately toxic mediums, drives the great development of chemical and pharmaceutical industries and makes a significant breakthrough in the development history of the glass lining industry.

By using the new structurally-combined precise controlled internal heating type electric furnace and the intelligent temperature program control/adjustment/recording instrument, in combination with the slow self-rotation of the tank body during sintering, the temperature control accuracy of the system is ±1° C., the new process, i.e., the controlled sintering "core technique" for synchronous integral sintering of the integral glass lining layers of the inner cylinder body at the absolutely same heating temperature is implemented to the utmost extent, and development is made towards the directions of thoroughly eliminating various potential hazards and defects such as invisible bubbles, cracks, slurry flowing and lining layer burst in the glass lining layers to the utmost extent and realizing the highest quality index of zero pinhole. The overall quality of the new glass lined reaction tank is greatly improved, the service life of the product is remarkably prolonged and this is another significant breakthrough in the development history of the glass lining industry.

The present invention thoroughly eliminates residual stress and hairline cracks in the glass lining layers. After the tank body of the new glass lined reaction tank is sintered at the last time, the temperature lowering curve can be set according to conversion from a soft state to a solid state of the glass lining layers and the tank body can be cooled slowly together with the furnace, so as to effectively avoid the generation of residual stress and hairline cracks in the glass lining layers of the tank body.

The present invention is applicable to various specifications of industrial glass lined reaction tanks, especially glass lined reaction tanks with a holding capacity above 500-60000 L.

The reaction tank provided by the present invention can be repetitively repaired and reused after the glass lining layers are damaged. The glass lined reaction tanks belong to high-value consumables and are damaged generally after 1-2 years of use. Some tanks are damaged after several months of use. The area of the damaged glass lining layers of a considerable quantity of reaction tanks only accounts for 0.05% of the total area and some only have several small point area damages. In China, a great number of reaction tanks which are worth several hundred millions of Chinese Yuan and consume several ten thousands of tons of steel materials are discarded every year for a reason that the glass lining layers are damaged and cannot be repaired for reuse, the steel materials are greatly wasted and the capital losses are serious.

The overall quality of the new glass lined reaction tank provided by the present invention is remarkably superior to that of domestic and overseas high-grade products (the selling price of which at abroad is 6-7 times of the selling price in China), the service life is doubly improved, more than three times of repair can be performed after the glass lining layers of the tank body are damaged as long as the steel plate thickness of the tank body is inspected and comprehensively satisfies glass lined pressure vessel design and manufacturing standards, the repair cost is 30% of the price of a new product, and the economic benefits obtained through the three times of repair can reach 200%. Accordingly, it can be seen that compared with the traditional glass lined reaction tank, a high-grade and high-quality new glass lined reaction tank can allow the user to obviously obtain more than 300%-400% of economic benefits, and the weight of saved steel materials is 4-5 times of the own weight of the tank body. If the product is popularized nationwide, tens of thousands of steel materials can be saved every year in China, and several hundred millions of Chinese Yuan can be saved for the user every year. This is also a significant breakthrough in the development history of the glass lining industry.

The present invention realizes leaping development towards directions of innovating advanced two-step molding "technical standards" for manufacturing iron blanks of tank bodies by using external heating type electric furnaces and changing the current situations that the quality of the integral glass lined reaction tank is low, the service life is not long, the big flange and the sealing performance of the tank mouth cannot satisfy the demands of actual production, the heating through the controlled sintering "core technique" which is executed abroad is not even, the temperature difference is great and the reaction tank cannot be repaired and reused as a pressure vessel after the glass lining layer of the reaction tank is damaged. A new glass lined reaction tank which has Chinese pioneer creative independent intellectual property is innovatively manufactured, the effect that "new standards of the manufacturing technique are patented and patent standards are internationalized" is realized, new one-step molding "technical standards" for manufacturing iron blanks of tank bodies are innovated, and the nominal pressure of the big flange of the tank body and the sealing performance of the tank mouth are perfectly improved. The system executing the controlled sintering "core technique" can measure and control the actual heating temperature of the integral glass lining layers of the tank body within the accuracy of ±1° C., a computer is used to realize full-automatic data program control, 500-60000 L high-grade and high-quality new glass lined reactions tanks which have the distinct characteristics of high quality, complete functions, capacity upsizing and type serialization, comprehensively satisfy requirements on Class III pressure vessels and obviously lead the international advanced levels all around will be put forward in combination with the development of high-capacity K-type composite glass lined reaction tanks and high-efficiency bulk heat-transfer glass lined reaction tanks on behalf of "Made in China", the reaction tanks can be repetitively repaired and reused after the glass lining layers of the reaction tanks are damaged, and the quality of the repaired reaction tanks satisfies the standards of new products, so as to forcibly drive a great revolution of the glass lining industry in the modern world.

BRIEF DESCRIPTION OF THE DRAWINGS

FIG. 2 is a schematic view of an integral structure of a tank body of a new glass lined reaction tank.

FIG. 2a is a schematic view of groups of symmetrical reinforcing rebar plates.

FIG. 2a1 is a partial enlarged schematic view of an integral structure of a tank mouth big flange after circumferentially welding groups of symmetrical reinforcing rebar plates on a flanged big flange structure component of an inner cylinder body and a closing mouth part of an outer jacket.

FIG. 2a2 is a schematic view after circumferentially welding a first reinforcing ring body with an arc-shaped neck and groups of symmetrical reinforcing rebar plates along an outer side of a straight cylinder body.

FIG. 4 is a schematic view of an integral structure of a new outer jacket.

FIG. 5 is a schematic view of an integral structure of a tank cover.

FIG. 5a is a schematic view of a structure of a flanged big flange of a tank cover.

FIG. 5b is a schematic view of a tank cover cylinder body.

FIG. 5c is a schematic view of a second reinforcing ring body with an arc-shaped neck.

FIG. 5c1 is a partial enlarged schematic view after circumferentially welding two groups of circumferential welding joints between a second reinforcing ring body and a tank cover straight cylinder body and a second big flange of a tank cover.

FIG. 5c2 is a schematic view after circumferentially welding groups of symmetrical reinforcing rebar plates on a second reinforcing ring body of a tank cover and an outer side part of a tank cover straight cylinder body.

FIG. 5c3 is a partial enlarged schematic view after welding a second reinforcing ring body and symmetrical reinforcing rebar plates on a second big flange of a tank cover and a tank cover straight cylinder body.

FIG. 5d is a schematic view of groups of symmetrical reinforcing rebar plates of a tank cover.

Figure 1:
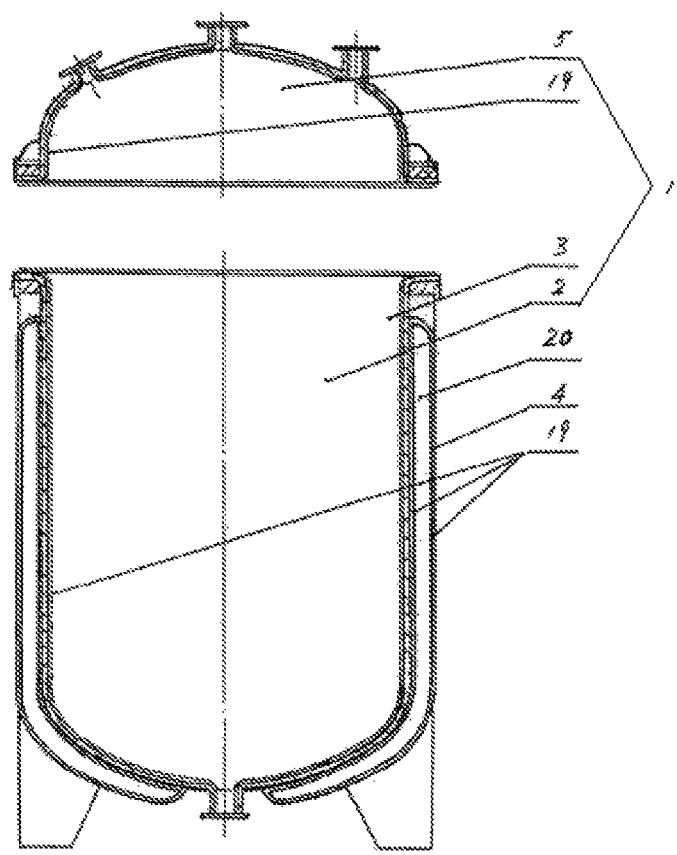
FIG. 1 is a schematic view of structures of a tank body and a tank cover of a new glass lined reaction tank.

Description of component reference signs1: tank body and tank cover of glass lined reaction tank
2: tank body
2a: first rebar plate
2b: circumferential welding joint
2a1-2a8: groups of symmetrical reinforcing rebar plates circumferentially welded on first reinforcing ring body of inner cylinder body and outer side of straight cylinder body
3: inner cylinder body
3a: inner cylinder body structure component
3a1: straight cylinder body of inner cylinder body
3a2: seal head of inner cylinder body
3a3: discharge outlet flange
3a4: first big flange
3a5: longitudinal welding joint
3a6: circumferential welding joint 3b: first reinforcing ring body
4: outer jacket
4.1: jacket body with closing mouth
4.1.1: closing mouth
4.2: outer jacket seal head with inner ring type closing mouth structure
4.2.1: inner ring type closing mouth structure
4.1a: longitudinal welding joint on outer jacket
4.2a: circumferential welding joint on outer jacket
5: tank cover
5b: tank cover straight cylinder body
5b1: second big flange
5c: second reinforcing ring body
5c1: circumferential welding joint
5d: second rebar plate
5d1-5d8: groups of symmetrical reinforcing rebar plates circumferentially welded on second reinforcing ring body of tank cover and outer side part of tank cover straight cylinder body
6: precise controlled internal heating type electric furnace
7: main body heating electric furnace
8: multilayer regionally-combined cylindrical electric furnace
8a: circular flat plate of multilayer regionally-combined cylindrical electric furnace
9: truncated-cone step-shaped electric furnace
9a: circular flat plate of truncated-cone step-shaped electric furnace
9b: seal-head-shaped heating structure component
10: ring body planar electric furnace
10a: ring planar electric furnace
10b: straight ring body electric furnace
11: planar electric furnace
12.1-12.16: electric heating elements on multilayer regionally-combined cylindrical electric furnace
12.17: electric heating element on truncated-cone step-shaped electric furnace
12.18: electric heating element on ring planar electric furnace
12.19: electric heating element on straight ring body electric furnace
12.20: electric heating element on planar electric furnace
Electric heating elements 12.1-12.20 are electric heating bands.
13: temperature measuring element, which is a thermocouple
13.1-13.20: groups of temperature measuring elements respectively corresponding to groups of electric heating elements 12.1-12.20
14: heat preserving cylinder body
15: heat preserving furnace top door which can be opened and closed
16: tank body sintering hanger self-rotating piece
17: ring body planar furnace lifting piece
18: PID intelligent temperature program control/adjustment/recording instrument
19: glass lining layer
20: chamber between inner cylinder body and outer jacket

DETAILED DESCRIPTION OF THE PREFERRED EMBODIMENTS

Explanation of terms:

One-step molding: the one-step molding described in the present invention refers to that an inner cylinder body and an outer jacket of a tank body have already been integrally molded before glass lining layers are sintered on the tank body and do not need to be processed again after the glass lining layers are sintered.

Class III pressure vessels: the Class III pressure vessels described in the present invention are Class III pressure vessels which satisfy China Supervision Regulations on Safety Technology of Pressure Vessels and are suitable for chemical reaction of extremely toxic and highly toxic mediums and inflammable or moderately toxic mediums.

For various index standards involved in the text, 7.1.4: thickness determining principle of steel plates for metallic basal bodies of glass lined equipment as specified in Technical Conditions for Glass Lined Equipment (GB25025-2010) shall apply; for 10.3: hydraulic tests of chambers, GB/T 7994 shall apply; for 10.4: airtight tests of equipment, GB/T 7995 shall apply; for 6.4.2: physical performance indexes of glass lining layers, after a test piece is manufactured, assessment is performed in accordance with HG/T 3105 and the performance thereof shall comply with Table 3; and direct-current high voltage withstanding performance of glass lining layers is detected in accordance with GB/T 7993 by adopting 20 KV direct-current high voltage.

Please refer to FIG. 1 to FIG. 7. It should be understood that structures, scales, sizes and the like illustrated in the drawings annexed to the description are only used for cooperating with the contents disclosed by the description for the sake of understanding and reading by one skilled in the art, are not used for limiting the limited conditions which can be implemented by the present invention, and thus have no technical substantive meanings. Any modification to structures, change to scale relations or adjustment to sizes without influencing the effects which can be produced by the present invention and the purposes which can be achieved by the present invention shall still fall into the range which can be covered by the technical contents disclosed by the present invention. In addition, terms such as "above", "below", "left", "right", "middle" and the like used in the description are only used for facilitating the clearness of description and are not used for limiting the range which can be implemented by the present invention. Change or adjustment to relative relations without substantively changing the technical contents shall also be considered as the range which can be implemented the present invention.

A glass lined reaction tank as shown in FIG. 1 comprises a tank body 2 and a tank cover 5; and the tank body and the tank cover are qualified products which have been inspected. The tank body 2 is an integral structure and comprises an inner cylinder body 3 and an outer jacket 4, and the inner cylinder body and the outer jacket are newly manufactured qualified products which have been inspected.

Figure 3:
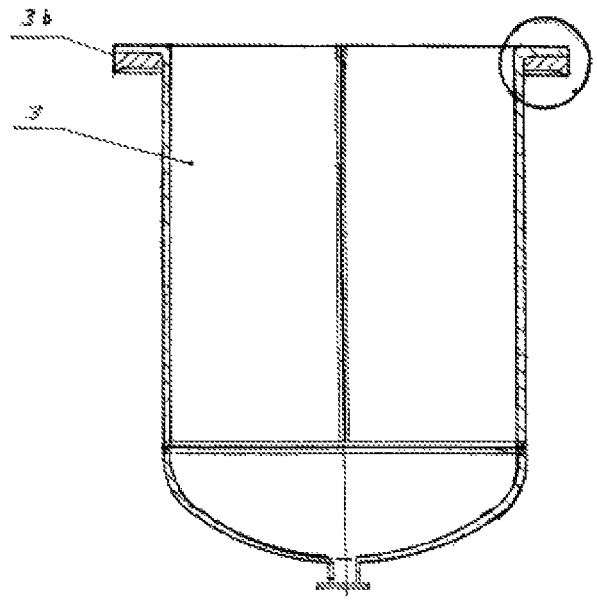
FIG. 3 is a schematic view of an integral big flange structure of a new inner cylinder body.
Figures 3A, 3B:
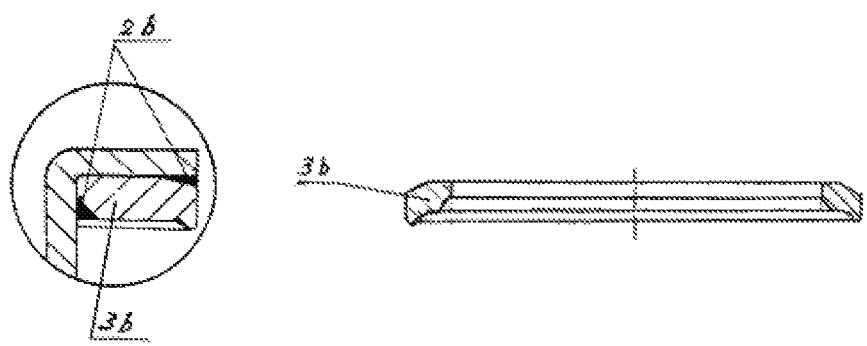
FIG. 3a is a partial enlarged schematic view after circumferentially welding two groups of circumferential welding joints on a first reinforcing ring body and a straight cylinder body of an inner cylinder body.
FIG. 3b is a schematic view of a first reinforcing ring body with an arc-shaped neck.
Figure 3C:
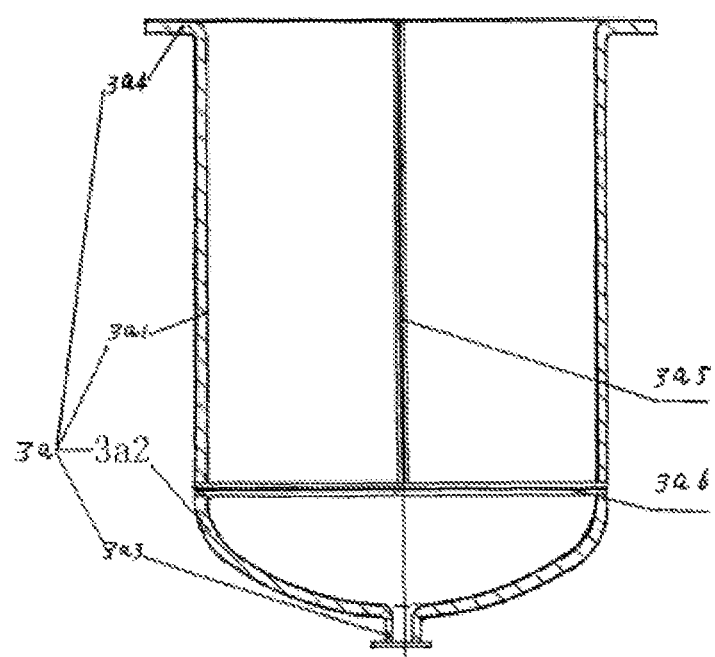
FIG. 3c is a schematic view of a flanged big flange of a new inner cylinder body.

As shown in FIG. 3 and FIG. 3c, the inner cylinder body 3 comprises a first reinforcing ring body 3b, a straight cylinder body 3a1, a seal head 3a2 and a discharge outlet flange 3a3, an upper mouth of the straight cylinder body 3a1 is flanged to form a first big flange 3a4, the first reinforcing ring body 3b is in close fit with an outer circumference of the straight cylinder body 3a1 and is welded below the first big flange 3a4, the straight cylinder body 3a1 is connected with the seal head 3a2, the discharge outlet flange 3a3 is arranged at a lower mouth of the seal head 3a2, and the straight cylinder body 3a1, the seal head 3a2, the discharge flange 3a3 and the first reinforcing ring body 3b are welded and combined to form an integral structure as shown in FIG. 3.

As shown in FIG. 4, the outer jacket 4 comprises a jacket body 4.1 with a closing mouth 4.1.1 and an outer jacket seal head 4.2 with an inner ring type closing mouth structure 4.2.1, and the jacket body 4.1 with the closing mouth and the outer jacket seal head 4.2 with the inner ring type closing mouth structure are welded and combined to form an integral structure.

As shown in FIG. 1 and FIG. 2, the outer jacket 4 is welded outside the inner cylinder body 3, the outer jacket 4 and the inner cylinder body form an integral structure, and a chamber 20 is formed between the outer jacket 4 and the inner cylinder body 3; and glass lining layers 19 are respectively coated and sintered on an inner wall of the inner cylinder body 3, a discharge outlet flange surface, an inner wall of the tank cover 5, each flange surface at an upper portion of the tank cover, an outer wall of the inner cylinder body 3 and an inner wall of the outer jacket.

In the prior art, the big flange of the tank body generally adopts a method of welding a high-neck big flange. As found by the inventor, although the degree of deformation of the big flange surface during high-temperature sintering of the glass lining layers can be reduced through the use of the high-neck big flange, the geometrical deformation and the sealing performance of the tank mouth are difficult to satisfy the actual installation and production use of the product, and when clips are excessively and forcibly tightened, the glass lining layers on the big flange surface are easily caused to be cracked. By directly flanging the straight cylinder body to form the big flange in the present invention and cooperatively adopting the reinforcing ring body, since the steel plate thickness of the reinforcing ring body can be set, adjusted and increased according to the nominal diameter of the tank body, the mechanical performance of resisting high-temperature deformation of the big flange surface is greatly improved and enhanced, and the nominal pressure of the big flange and the sealing performance of the tank mouth are remarkably improved. When the nominal diameter of the tank body is increased, the steel plate thickness of the reinforcing ring body is larger. Therefore, the nominal pressure of the big flange of the glass lined reaction tank and the sealing performance of the tank mouth are perfectly improved.

More preferably, as shown in FIG. 3b, the first reinforcing ring body is provided with an arc-shaped neck to facilitate fixation through clips.

As a further reformation to the prior art, glass lining layers are coated and sintered on the outer wall of the inner cylinder body and the inner wall of the outer jacket to prevent the glass lined reaction tank from being oxidized and corroded during repetitive high-temperature sintering and long-term use.

Further, steel plate thickness of the straight cylinder body 3a1, the seal head 3a2 and the outer jacket 4 can be increased by 2-10 mm according to glass lined pressure vessel design and manufacturing standards.

As shown in FIG. 3a, a group of circumferential welding joints 2b are circumferentially welded between the first reinforcing ring body 3b of the tank body 2 and the outer circumference of the straight cylinder body 3a1, and a group of circumferential welding joints 2b are also circumferentially welded between the first reinforcing ring body 3b and the first big flange 3a4.

As shown in FIG. 2, FIG. 2a, FIG. 2a1 and FIG. 2a2, the tank body further comprises a plurality of groups of first rebar plates 2a having a reinforcing effect, the plurality of groups of first rebar plates 2a having the reinforcing effect are symmetrically distributed along the outer circumference of the straight cylinder body 3a1 of the inner cylinder body and are located between the first reinforcing ring body 3b and a closing mouth part 4.1.1 of the jacket body 4.1 with the closing mouth, the first rebar plates 2a are welded on the outer circumference of the inner cylinder body 3 and are welded with the first reinforcing ring body 3b, and a number of the first rebar plates 2a is 8-36. By designing the first rebar plates, the nominal pressure of the big flange and the sealing performance of the tank mouth can be further improved.

As shown in FIG. 5, FIG. 5a and FIG. 5b, the tank cover 5 comprises a tank cover straight cylinder body 5b, a lower mouth of the tank cover straight cylinder body 5b is flanged to form a second big flange 5b1, and a second reinforcing ring body 5c which is in close fit with an outer circumference of the tank cover straight cylinder body 5b is welded on the second big flange 5b1.

As shown in FIG. 5c1, a group of circumferential welding joints 5c1 are circumferentially welded between the second reinforcing ring body 5c and the outer circumference of the tank cover straight cylinder body 5b, and a group of circumferential welding joints 5c1 are also circumferentially welded between the second reinforcing ring body 5c and the second big flange 5b1.

As shown in FIG. 5, FIG. 5c2, FIG. 5c3 and FIG. 5d, a plurality of groups of second rebar plates 5d having a reinforcing effect are further welded on the second reinforcing ring body 5c, the plurality of groups of second rebar plates 5d having the reinforcing effect are symmetrically distributed along the outer circumference of the tank cover straight cylinder body 5b, and a number of the second rebar plates 5d is 8-36.

As shown in FIG. 1, glass lining layers 19 are respectively coated and sintered on the inner wall of the tank cover, a big flange surface and each flange surface at an upper portion of the tank cover.

More preferably, as shown in FIG. 5c, the second reinforcing ring body 5c is provided s with an arc-shaped neck. The second reinforcing ring body 5c and the second rebar plates 5d have the similar effect to the first reinforcing ring body 3b and the first rebar plates 2a added on the tank body.

The glass lined reaction tank is manufacturing according to the following steps:

1) manufacturing an inner cylinder body component:

respectively manufacturing a straight cylinder body 3a1 with an upper mouth which is flanged to form a first big flange 3a4, a seal head 3a2 and a discharge outlet flange 3a3; and welding the straight cylinder body 3a1, the seal head 3a2 and the discharge outlet flange 3a3 to form the inner cylinder body structure component 3a, wherein, in the inner cylinder body structure component, the straight cylinder body 3a1 and the seal head 3a2 are thickened by 2-10 cm according to glass lined pressure vessel design and manufacturing standards;

and respectively performing X-ray flaw detection to a longitudinal welding joint 3a5 on the straight cylinder body 3a1 and a low butt circumferential welding joint 3a6 between the straight cylinder body 3a1 and the seal head 3a2 to obtain a qualified inner cylinder body structure component.

Specifically, X-ray flaw detection is performed to welding joints according to China standards Nondestructive Testing of Pressure Equipment (JB/T 4730). The qualified inner cylinder body structure component refers to an inner cylinder body structure component, an X-ray flaw detection result of which satisfies requirements. Specifically, the X-ray flaw detection result shall satisfy requirements on Class II pressure vessels in Supervision Regulations on Safety Technology of Pressure Vessels.

2) manufacturing an inner cylinder body 3 with an integral structure:

welding a first reinforcing ring body 3b at a lower portion of the first big flange 3a4 of the inner cylinder body component, the first reinforcing ring body 3b being in close fit with an outer circumference of the straight cylinder body 3a1, circumferentially welding a group of circumferential welding joints 2b between the first reinforcing ring body 3b of a tank body 2 and the outer circumference of the straight cylinder body 3a1, and also circumferentially welding a group of circumferential welding joints 2b between the first reinforcing ring body 3b and the first big flange 3a4 to obtain the inner cylinder body 3 with the integral structure.

Steel plate thickness of the first reinforcing ring body 3b can be set, adjusted and increased according to nominal diameter of the tank body. The larger the nominal diameter of the tank body is, the larger the thickness of the first reinforcing ring body is.

3) respectively manufacturing a jacket body 4.1 with a closing mouth and a seal head 4.2 with an inner ring, and welding to form an integral structure to obtain an outer jacket 4 with the integral structure.

Steel plate thickness of the outer jacket can be increased by 2-10 mm according to glass lined pressure vessel design and manufacturing standards.

4) performing X-ray flaw detection to a longitudinal welding joint 4.1a and a circumferential welding joint 4.2a on the outer jacket to obtain a qualified outer jacket 4.

Specifically, 100% X-ray flaw detection can be performed to welding seams according to China standards Nondestructive Testing of Pressure Equipment (JB/T 4730). The qualified outer jacket refers to an outer jacket, an X-ray flaw detection result of which satisfies requirements. Specifically, the X-ray flaw detection result shall satisfy requirements on Class II pressure vessels in Supervision Regulations on Safety Technology of Pressure Vessels.

5) coating glass lining slurry on an outer wall of the inner cylinder body 3 and an inner wall of the outer jacket 4, and sintering through steps 9) and 10) to form glass lining layers 19.

The glass lining slurry is glass lining slurry for conventional glass lined reaction tanks and shall satisfy requirements on various physical and chemical performance indexes of glass lining layers in Table 3 of HG/T 3105.

6) combining and welding the inner cylinder body 3 and the outer jacket 4 to form the tank body 2.

7) circumferentially welding a plurality of groups of symmetrically distributed first rebar plates 2a having a reinforcing effect between the first reinforcing ring body 3b and a closing mouth part 4.1.1 of the jacket body 4.1 with the closing mouth on an outer side of the tank body 2 to obtain the tank body 2 which is an integral structure obtained through one-step molding.

8) coating glass lining slurry on an inner wall of the inner cylinder body 3, a first big flange surface and a discharge outlet flange surface to obtain the tank body 2 coated with the glass lining slurry on the inner wall.

The glass lining slurry used in this step is glass lining slurry for conventional glass lined reaction tanks.

9) sintering the tank body coated with the glass lining slurry by using a precise controlled internal heating type electric furnace, controlling heating temperature of all parts of glass lining layers coated on the inner wall to be consistent and performing synchronous integral sintering.

10) repetitively sintering the tank body by adopting the sintering method in step 9), and coating glass lining layers on the inner wall of the inner cylinder body, the first big flange surface and the discharge outlet flange surface before sintering at each time.

A controlled sintering "core technique" is adopted for sintering. A sintering process implementing medium-temperature pre-sintering, high-temperature sintering, heat preserving and stage-by-stage controlled sintering can be adopted during sintering of the glass lining prime coat on the inner wall of the tank body, sintering temperature is room temperature to 900° C., and total sintering time is 5.5-6 h.

Specifically, during sintering, temperature can be slowly increased from room temperature to 150° C., then temperature is increased from 150° C. to 400° C. to perform pre-sintering, heat is preserved, then temperature is increased from 400° C. to 600° C. to perform pre-sintering, heat is preserved, total sintering time at the temperature section of room temperature to 600° C. is 4 h, then high-temperature sintering is performed from 600° C. to 900° C., heat is preserved, and total time of high-temperature sintering from 600° C. to 900° C. and heat preservation is 1.5-2h.

Under normal circumstances, times of repetitive sintering of the new glass lined reaction tank can reach 6-7.

11) cooling the tank body sintered at the last time together with the furnace, and performing a hydraulic test to the chamber 20 between the inner cylinder body 3 and the outer jacket 4 according to 20GB/T 7994 to obtain the tank body of the glass lined reaction tank.

12) manufacturing a tank cover:

manufacturing a tank cover 5 with a tank cover straight cylinder body 5b with a lower mouth which is flanged to form a second big flange 5b1, welding a second reinforcing ring body 5c which is in close fit with an outer circumference of the tank cover straight cylinder body 5b and is provided with an arc-shaped neck at an upper portion of the second big flange 5b1, circumferentially welding a group of circumferential welding joints 5c1 between the second reinforcing ring body 5c and the outer circumference of the tank cover straight cylinder body 5b, also circumferentially welding a group of circumferential welding joints 5c1 between the second reinforcing ring body 5c and the second big flange 5b1, further welding a plurality of groups of second rebar plates 5d which are symmetrically distributed along the outer circumference of the tank cover straight cylinder body 5b on the second reinforcing ring body 5c to obtain an integral structure component of the tank cover, and coating and sintering glass lining slurry on the inner wall of the integral structure component of the tank cover and each flange surface at an upper portion of the tank cover to obtain the tank cover 5 of the glass lined reaction tank.

Further, a glass lining layer is also coated and sintered on a second big flange surface of the tank cover.

The glass lining slurry used in this step is glass lining slurry for conventional glass lined reaction tanks.

During sintering of the tank cover, a conventional tank cover glass lining layer sintering process can be adopted.

Figure 6:
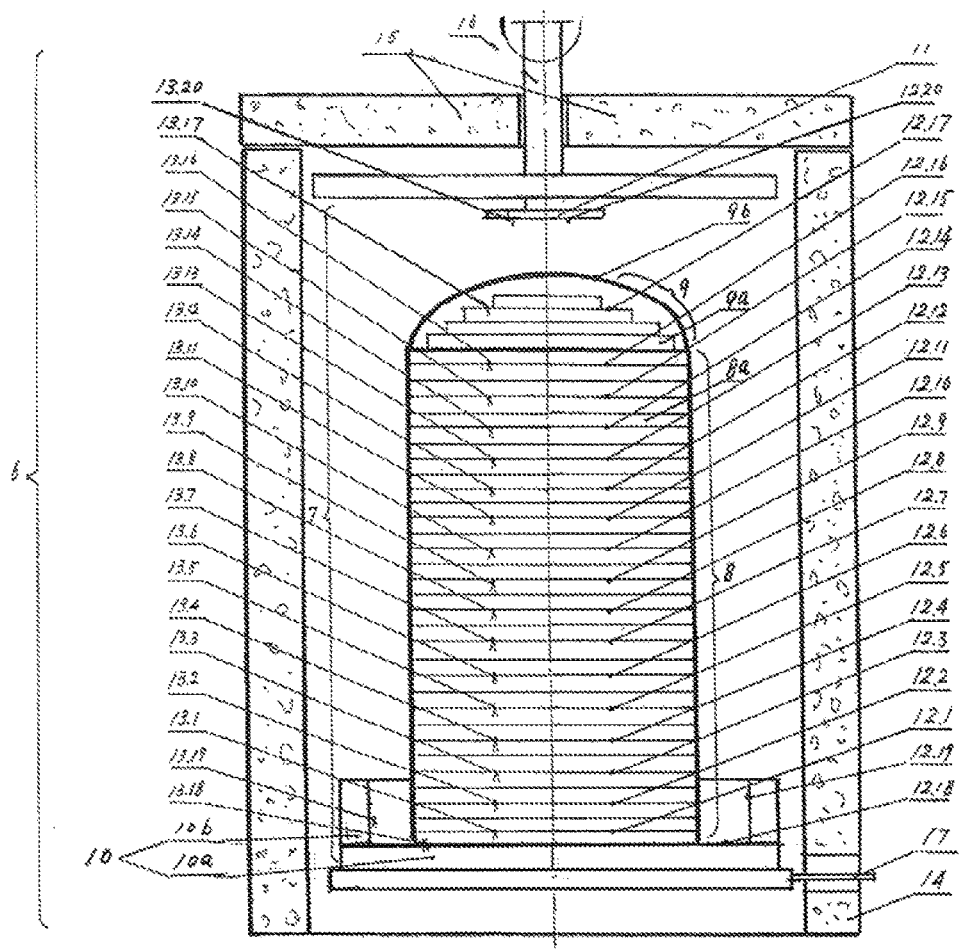
FIG. 6 is a schematic view of a new structurally-combined precise controlled internal heating type electric furnace with an intelligent temperature program control/adjustment/recording instrument.
Figure 7:
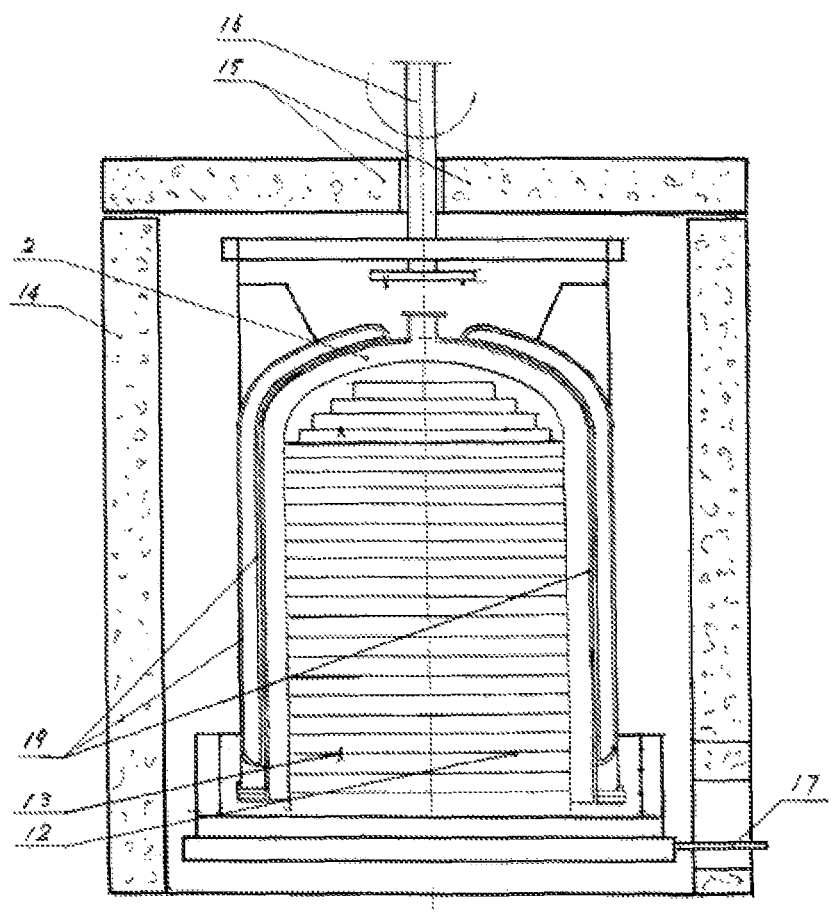
FIG. 7 is a schematic view for sintering a tank body of a new glass lined reaction tank by using a new structurally-combined precise controlled internal heating type electric furnace.

Specifically, the precise controlled internal heating type electric furnace used in step 9), as shown in FIG. 6 and FIG. 7, comprises a heat preserving cylinder body 14, and a top portion of the heat preserving cylinder body 14 is provided with a group of heat preserving furnace top doors 15 which can be opened and closed; the heat preserving furnace top doors 15 thereon are provided with a tank body sintering hanger self-rotating piece 16 which penetrates through the heat preserving furnace top doors; a bottom portion of the tank body sintering hanger self-rotating piece is further provided with a planar electric furnace 11, and a bottom surface of the planar electric furnace is provided with a group of electric heating elements; the precise controlled internal heating type electric furnace further comprises a main body heating electric furnace 7 in the heat preserving cylinder body 14; the main body heating electric furnace 7 sequentially comprises a ring body planar electric furnace 10, a multilayer regionally-combined cylindrical electric furnace 8 and a truncated-cone step-shaped electric furnace 9 from bottom to top; a ring body planar furnace lifting piece 17 is further provided below the ring body planar electric furnace 10; the ring body planar electric furnace 10 consists of a ring planar electric furnace 10a and a straight ring body electric furnace 10b; a ring plane of the ring planar electric furnace 10a thereon is provided with a plurality of turns of concentric circular grooves with different diameters; a group of electric heating elements 12.18 are wound in the concentric circular grooves; an inner circumferential wall of the straight ring body electric furnace 10b is provided with a plurality of ring grooves from bottom to top; a group of electric heating elements 12.19 are wound in the ring grooves; the multilayer regionally-combined cylindrical electric furnace 8 is formed by stacking a plurality of layers of circular flat plates 8a with the same diameter and central axes which are overlapped, outer circumferential walls of the circular flat plates are provided with ring grooves, and a group of electric heating elements 12.1-12.16 are wound in the ring grooves of every 2-8 layers, preferably 5-8 layers of circular flat plates; the truncated-cone step-shaped electric furnace 9 is formed by stacking a plurality of circular flat plates 9a with different diameters and central axes which are overlapped, the diameters of the circular flat plates 9a are successively decreased from bottom to top to form a step-shaped circular platform, a group of electric heating elements 12.17 are wound in every 2-8 layers, preferably 5-8 layers of step-shaped platform surfaces, a seal-head-shaped heating structure component 9b which is structurally fit and consistent with an inner wall of the seal head 3a2 of the inner cylinder body covers a periphery of the truncated-cone step-shaped electric furnace 9, and the seal-head-shaped heating structure component is made of heat-resistant steel; and all groups of electric heating elements in the precise controlled internal heating type electric furnace are respectively connected with a temperature control system.

In the main body heating electric furnace 7 of the precise controlled internal heating type electric furnace, an overall shape jointly formed by the multilayer regionally-combined cylindrical electric furnace 8 and the truncated-cone step-shaped electric furnace 9 is structurally fit and consistent with the inner wall of the inner cylinder body 3 of the tank body, and during sintering, as shown in FIG. 7, the ring body planar electric furnace 10, the multilayer regionally-combined cylindrical electric furnace 8 and the truncated-cone step-shaped electric furnace 9 respectively and correspondingly heat the first big flange 3a4 of the inner cylinder body 3 and the overall outer side of the end portion of the first big flange of the tank body 2, the straight cylinder body 3a1 and the inner seal head 3a2, and the planar electric furnace 11 at the bottom portion of the tank body sintering hanger self-rotating piece correspondingly heats the discharge outlet flange 3a3 and the inner ring type closing mouth structure 4.2.1 of the outer jacket seal head 4.2.

Figure 6A:
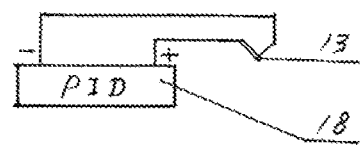
FIG. 6a is a schematic view of a combination of an intelligent temperature program control/adjustment/recording instrument 18 and a temperature measuring element 13.

As shown in FIG. 6a, the temperature control system is used for adjusting heating temperature of electric heating elements connected with the temperature control system, and comprises:

a temperature measuring element 13 fit with a group of electric heating elements, arranged in a heating area of the group of electric heating elements, and used for measuring heating temperature of the inner wall of the tank body in the heating area of the group of electric heating elements and transmitting a temperature signal; and a temperature controller 18 arranged outside the heat preserving cylinder body 14 of the precise controlled internal heating type electric furnace, connected with the temperature measuring element and the electric heating elements which are fit with the temperature measuring element (not shown), the temperature controller stores predetermined temperature or a temperature control curve, and is used for receiving the temperature signal transmitted by the temperature measuring element, comparing the temperature signal with the predetermined temperature or the temperature control curve and then adjusting the heating temperature of the electric heating elements.

As shown in FIG. 6, each group of electric heating elements 12.1-12.20 is fit with a temperature measuring element 13.1-13.20, the temperature measuring element which is fit with the group of electric heating elements is arranged in the same heating area of the group of electric heating elements, and each group of electric heating elements is independently controlled by the independent temperature controller according to temperature measured by the temperature measuring element which is fit with the group of electric heating elements and the preset temperature curve.

The temperature controller belongs to the prior art. An intelligent temperature controller can precisely control a working state of the electric heating elements according to design requirements and can be applied to the present invention to precisely control and implement synchronous integral sintering of the integral glass lining layers 19 of the tank body 2 at the same heating temperature. An intelligent temperature control device integrated with functions of temperature program control, adjustment and recording has already been a mature prior art, e.g., PID intelligent temperature program control/adjustment/recording instrument. By adopting such intelligent temperature control device, temperature can be precisely set, controlled and adjusted, and whole-process automatic printing and recording can be realized.

A glass lined reaction tank with a holding capacity of 500 L and a glass lined reaction tank with a holding capacity of 60000 L are respectively manufactured by adopting the above method. As detected by adopting 20 KV direct-current high voltage according to a glass lining layer direct-current high voltage performance detection method in GB25025-2010 GB/T 7993, the integral glass lining layers in the inner cylinder body are not electrically conductive. For glass lined reaction tanks which belong to Class III pressure vessels, after airtight tests are performed to the reaction tanks according to GB/T 7995, test results show that no leakage occurs.

What is claimed is:

1. A precise controlled internal heating type electric furnace, characterized in that the precise controlled internal heating type electric furnace comprises a heat preserving cylinder body (14), and a top portion of the heat preserving cylinder body (14) is provided with a group of heat preserving furnace top doors (15) which can be opened and closed; the heat preserving furnace top doors (15) thereon are provided with a tank body sintering hanger self-rotating piece (16) which penetrates through the heat preserving furnace top doors; a bottom portion of the tank body sintering hanger self-rotating piece is further provided with a planar electric furnace (11), and a bottom surface of the planar electric furnace is provided with a group of electric heating elements; the precise controlled internal heating type electric furnace further comprises a main body heating electric furnace (7) in the heat preserving cylinder body (14); the main body heating electric furnace (7) sequentially comprises a ring body planar electric furnace (10), a multilayer regionally-combined cylindrical electric furnace (8) and a truncated-cone step-shaped electric furnace (9) from bottom to top; a ring body planar furnace lifting piece (17)

is further provided below the ring body planar electric furnace (10); the ring body planar electric furnace (10) consists of a ring planar electric furnace (10a) and a straight ring body electric furnace (10b); a ring plane of the ring planar electric furnace (10a) thereon is provided with a plurality of turns of concentric circular grooves with different diameters; a group of electric heating elements (12.18) are wound in the concentric circular grooves; an inner circumferential wall of the straight ring body electric furnace (10b) is provided with a plurality of ring grooves from bottom to top; a group of electric heating elements (12.19) are wound in the ring grooves; the multilayer regionally-combined cylindrical electric furnace (8) is formed by stacking a plurality of layers of circular flat plates (8a) with the same diameter and central axes which are overlapped, outer circumferential walls of the circular flat plates are provided with ring grooves, and a group of electric heating elements (12.1-12.16) are wound in the ring grooves of every 2-8 layers; the truncated-cone step-shaped electric furnace (9) is formed by stacking a plurality of circular flat plates (9a) with different diameters and central axes which are overlapped, the diameters of the circular flat plates (9a) are successively decreased from bottom to top to form a step-shaped circular platform, a group of electric heating elements (12.17) are wound in every 2-8 layers of step-shaped platform surfaces, a seal-head-shaped heating structure component (9b) which is structurally fit and consistent with an inner wall of the seal head (3a2) of the inner cylinder body covers a periphery of the truncated-cone step-shaped electric furnace (9), and the seal-head-shaped heating structure component is made of heat-resistant steel; and all groups of electric heating elements in the precise controlled internal heating type electric furnace are respectively connected with a temperature control system.

2. The precise controlled internal heating type electric furnace according to claim 1, characterized in that in the main body heating electric furnace (7) of the precise controlled internal heating type electric furnace (6), an overall shape jointly formed by the multilayer regionally-combined cylindrical electric furnace (8) and the truncated-cone step-shaped electric furnace (9) is structurally fit and consistent with an inner wall of the inner cylinder body (3) of the tank body, and during sintering, the ring body planar electric furnace (10) consists of a ring planar electric furnace (10a) and a straight ring body electric furnace (10b) and correspondingly heat a first big flange (3a4) of the inner cylinder body (3) and an overall outer side of end portion of first big flange of the tank body (2), the multilayer regionally-combined cylindrical electric furnace (8), the truncated-cone step-shaped electric furnace (9) and a seal-head-shaped heating structure component (9b) correspondingly heat a straight cylinder body (3a1) and an inner seal head (3a2), and the planar electric furnace (11) at bottom portion of the tank body sintering hanger self-rotating piece correspondingly heats a discharge outlet flange (3a3) and an inner ring type closing mouth structure (4.2.1) of an outer jacket seal head (4.2).

3. The precise controlled internal heating type electric furnace according to claim 1, characterized in that the ring body planar electric furnace (10) of the precise controlled internal heating type electric furnace consists of a ring planar electric furnace (10a) and a straight ring body electric furnace (10b), the straight ring body electric furnace (10b) correspondingly auxiliary heat an outside of a first big flange (3a4) of the inner cylinder body (3) and an overall outer side structure component of end portion of first big flange of the tank body (2) to more accurately and effectively control the heating temperature of an overall glass lining layer be the same, thoroughly eliminate various potential hazards and defects on inside wall glass lining layers to utmost extent, which includes realize a highest quality index of zero pinhole, and guarantee that a big flange surface is absolutely not deformed after repetitive high-temperature sintering, a nominal pressure of the big flange surface and an overall sealing performance of a tank mouth are perfectly improved, and after glass lining layers on inner walls are sintered and inspected as qualified, a glass lined reaction tank which comprehensively satisfies requirements on Class III pressure vessels can be obtained.

4. The precise controlled internal heating type electric furnace according to claim 1, characterized in that the planar electric furnace (11) at a bottom portion of the tank body sintering hanger correspondingly auxiliary heats a discharge outlet flange (3a3) and an inner ring type closing mouth structure (4.2.1) of an outer jacket seal head (4.2) to more effectively control synchronous integral heating of glass lining layers on inner walls at the same heating temperature, thoroughly eliminate various potential hazards and defects on inside wall glass lining layers to utmost extent, which includes realize a highest quality index of zero pinhole.

5. The precise controlled internal heating type electric furnace according to claim 1, characterized in that the seal-head-shaped heating structure component (9b) which is structurally fit and consistent with an inner wall of the seal head (3a2) of the inner cylinder body covers a periphery of the truncated-cone step-shaped electric furnace (9), and the seal-head-shaped heating structure component is made of heat-resistant steel to effectively improve even heating of the seal-head-shaped heating structure component and precisely control glass lining layers on an inner wall of the seal head (3a2) of the inner cylinder body of the tank body and a straight cylinder body (3a1) at same heating temperature, thoroughly eliminate various potential hazards and defects on overall seal head glass lining layers to utmost extent, which includes realize highest quality index of zero pinhole.

6. The precise controlled internal heating type electric furnace according to claim 1, characterized in that a temperature control system is used for adjusting heating temperature of electric heating elements connected with the temperature control system, and comprises a temperature measuring element which is fit with a group of electric heating elements, is arranged in a heating area of the group of electric heating elements and is used for measuring heating temperature of an inner chamber of the tank body in a heating area of the group of electric heating elements and transmitting a temperature signal; and a temperature controller which is arranged outside the heat preserving cylinder body (14) of the precise controlled internal heating type electric furnace (6), is connected with the temperature measuring element and the electric heating elements which are fit with the temperature measuring element, the temperature controller stores predetermined temperature or a temperature control curve, and is used for receiving temperature signals transmitted by the temperature measuring element, comparing the temperature signals with predetermined temperature or the temperature control curve and then adjusting heating temperature of the electric heating elements.

* * * * *